United States Patent
Aharchaou et al.

(10) Patent No.: US 11,294,087 B2
(45) Date of Patent: Apr. 5, 2022

(54) DIRECTIONAL Q COMPENSATION WITH SPARSITY CONSTRAINTS AND PRECONDITIONING

(71) Applicants: Mehdi Aharchaou, The Woodlands, TX (US); Erik R. Neumann, Houston, TX (US)

(72) Inventors: Mehdi Aharchaou, The Woodlands, TX (US); Erik R. Neumann, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 557 days.

(21) Appl. No.: 16/275,835

(22) Filed: Feb. 14, 2019

(65) Prior Publication Data

US 2019/0302296 A1    Oct. 3, 2019

Related U.S. Application Data

(60) Provisional application No. 62/648,730, filed on Mar. 27, 2018.

(51) Int. Cl.
   *G01V 1/36* (2006.01)
   *G01V 99/00* (2009.01)

(52) U.S. Cl.
   CPC .............. *G01V 1/362* (2013.01); *G01V 1/368* (2013.01); *G01V 99/005* (2013.01); *G01V 2210/512* (2013.01); *G01V 2210/56* (2013.01)

(58) Field of Classification Search
   CPC ....... G01V 1/362; G01V 1/368; G01V 99/005
   See application file for complete search history.

(56) References Cited

U.S. PATENT DOCUMENTS

| | | | |
|---|---|---|---|
| 7,072,767 B2* | 7/2006 | Routh | G01V 1/28 702/14 |
| 2017/0068009 A1* | 3/2017 | Kostov | G01V 1/364 |
| 2017/0199289 A1* | 7/2017 | Peng | G01V 1/375 |

OTHER PUBLICATIONS

Bickel, S. H. et al. (1985) "Plane-Wave Q Deconvolution," *Geophysics*, v. 50(9), pp. 1426-1439.

(Continued)

*Primary Examiner* — Bryan Bui
(74) *Attorney, Agent, or Firm* — ExxonMobil Upstream Research Company—Law Department

(57) ABSTRACT

A method for directional Q compensation of seismic data may comprise calculating angle-dependent subsurface travel times; applying directional Q compensation to the prestack seismic data to obtain Q-compensated data in time-space domain, wherein the directional Q compensation is based on the angle-dependent subsurface travel times; and using the Q-compensated data to generate an image of the subsurface. Directional Q compensation may comprise determining an angle-dependent forward E operator and an angle-dependent adjoint E* operator using the angle-dependent subsurface travel times; and applying a sparse inversion algorithm using the angle-dependent operators to obtain a model of Q-compensated data. The angle-dependent operators may be preconditioned by introducing ghost and source effects in a wavelet matrix and a transpose of the wavelet matrix, respectively, such that applying a sparse inversion algorithm using the preconditioned angle-dependent operators is used to obtain a model of Q-compensated, deghosted data without source effects.

13 Claims, 12 Drawing Sheets

(56) References Cited

OTHER PUBLICATIONS

Futterman, W. I. (1962) "Dispersive Body Waves," *J. Geophysics Res.*, v. 67, pp. 5729-5291.
Hansen P. (1998) "Rank-deficient and Discrete Ill-Posed Problems: Numerical Aspects of Linear Inversion," *SIAM Monographs on Mathematical Modeling and Computation*, (Chap. 6) pp. 145-149.
Moczo, P. et al. (2005) "On the Rheological Models used for Time Domain Method of Seismic Wave Propagation," *Geophysics Res. Lett.*, v, 32, L01306, 5 pages.
Trad, D. et al. (2003) "Latest Views of the Sparse Radon Transform," *Geophysics*, v. 68(1), pp. 386-399.
Trantham, E. C. et al. (2017) "AVA Friendly Q Amplitude Compensation," *SEG Int'l. Exp. & 87$^{th}$ Ann. Mtg.*, pp. 643-645.
Xia, G. (2015) "Proper Time-Referencing for Prestack Q Estimation and Compensation," *67$^{th}$ EAGE Conference & Exhibition*, 4 pages.
Ziolkowski et al. (Year) "The Signature of an Air Gun Array: Computation from Near Field Measurements Including Interactions," *Geophysics*, vol. 47(10), pp. 1413-1421.

\* cited by examiner

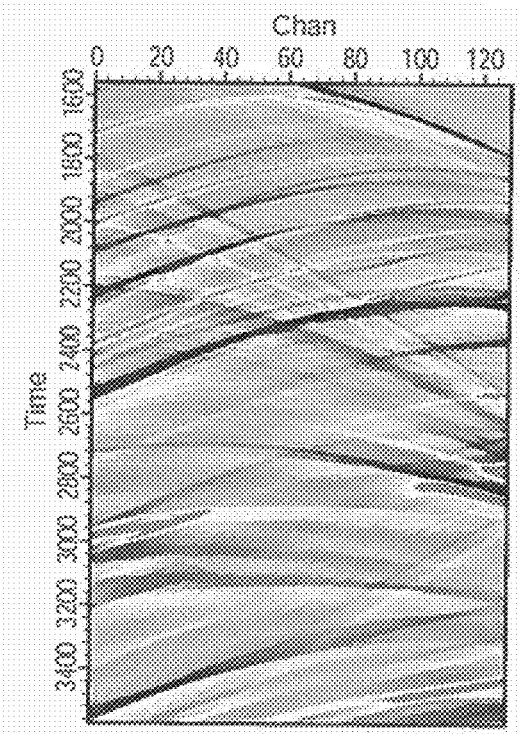
FIG. 7A
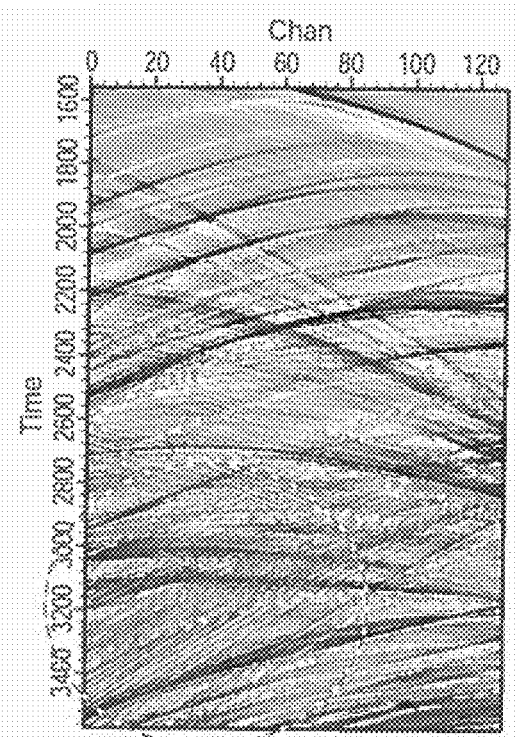
701 FIG. 7B
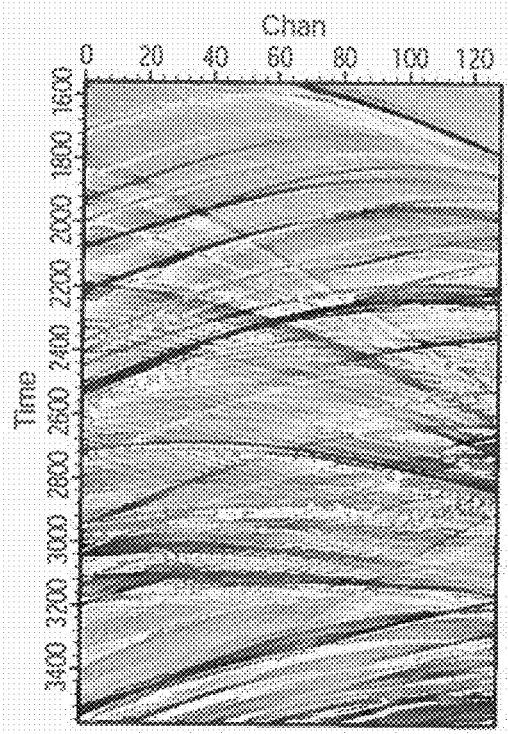
FIG. 7C
FIG. 7D

DIRECTIONAL Q COMPENSATION WITH SPARSITY CONSTRAINTS AND PRECONDITIONING

CROSS REFERENCE TO RELATED APPLICATIONS

This application claims the priority benefit of U.S. Provisional Patent Application No. 62/648,730, filed Mar. 27, 2018 entitled DIRECTIONAL Q COMPENSATION WITH SPARSITY CONSTRAINTS AND PRECONDITIONING, the disclosure of which is incorporated herein by reference.

BACKGROUND

Field of Disclosure

The present disclosure relates to the field of hydrocarbon management and geophysical prospecting and, more particularly, to geophysical seismic data processing. Specifically, embodiments described herein relate to methods for directional Q compensation of seismic data.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

In the oil and gas industry, seismic prospecting is commonly used in land and marine environments to assist in the search for and evaluation of subterranean hydrocarbon deposits and other hydrocarbon management activities. In marine environments, for example, seismic data may be gathered by conducting a seismic survey using one or more seismic sources configured to emit acoustic waves (each wave referred to as "source signature"). As the acoustic wave propagates through the water and the subsurface, it may experience loss of energy due to absorption by the propagation medium. The absorptive property of a medium can be quantified by a quality factor "Q" which decreases in value as the medium becomes more absorptive. Absorption limits resolution of seismic data because it causes both amplitude decay and phase delay especially for the high frequencies carried by the acoustic waves. For brevity, these absorption-related amplitude decay and phase delay effects are referred to herein as "Q effects."

The acoustic waves eventually may be reflected by a geologic structure in the subsurface and propagate upward, reaching seismic detectors or receivers at certain angles. The horizontal distance between each such detector and the source is commonly referred to as "offset," while the difference in travel times as the acoustic wave reaches detectors at different offsets is known as "moveout." The case where the incidence angle between the wave and a detector is close to zero (i.e. almost vertical incidence) is known as one-dimensional (1-D) propagation.

In real life, propagation of seismic waves is multi-dimensional (2-D or 3-D) rather than being one-dimensional (1-D). For example, in marine seismic data acquisition, for a vessel towing a single cable with multiple detectors, the seismic traces exist in a 2-D time-space (t–x) domain. When the vessel tows a plurality of cables at the same time, the seismic data exists in a 3-D (t–x–y) domain. Because of acquisition constraints, the spacing between detectors may be regular or it may be irregular, and spatial aliasing may occur in the recorded seismic traces when the spacing between the detectors is not dense enough. This may create problems for many seismic processing techniques which are critically dependent upon proper spatial sampling.

Acoustic waves reflected by the subsurface may be first received by detectors but continue traveling upwards until reaching the sea surface, where the waves may be reflected back. The reflected wave is typically referred to as a "ghost" wave—"detector-side" if received by detectors and "source-side" if received by the source. The presence of ghost waves in seismic data may create notches (or gaps) in the amplitude spectrum which limit seismic bandwidth and result in poor resolution. Accordingly, seismic data gathered via seismic surveys may include a combination of the subsurface reflectivity of interest, Q effects, ghost waves, and the far-field source signature. It is therefore desirable to compensate for the Q effects (i.e. "Q compensation"), to remove the ghost waves (i.e. "deghosting") in the source and detector sides, and to remove the far-field source signature (i.e. "source designature") from the recorded traces in order to broaden the seismic bandwidth and enhance the resolution of seismic data.

The field of "broadband marine seismic" emerged in the last decade as a key technology area in exploration geophysics to meet these objectives. When only deghosting and source designature are applied on the recorded traces, seismic bandwidth is known to be dominated by low frequencies, especially for those seismic waves that have traveled longer in the subsurface. Hence, Q compensation has become an integral part of broadband seismic processing workflows because it provides a deterministic tool to balance seismic bandwidth and improve resolution.

The goal of Q compensation under Futterman's constant Q model (Futterman, 1962) is to correct for a factor of the form:

$$A(f, T_s) = e^{-\frac{\pi f T_s}{Q} + \frac{2ifT_s}{Q} \log\left(\frac{f}{f_r}\right)} \quad (1)$$

in which $A(f,T_s)$ quantifies amplitude decay (captured by the real part) and phase delay (captured by the imaginary part) for a signal at frequency f and subsurface travel time $T_s$, and Q is the quality factor at a reference frequency $f_r$. For simplicity, the quality factor Q may be assumed to be spatially-invariant and exactly known. To achieve an accurate Q compensation, it is therefore important to have the correct subsurface travel time $T_s$.

Existing Q compensation techniques attempt to correct for $A(f, T_s)$ through a 1-D filter, which is applied trace by trace on the recorded seismic data. The 1-D filter may be unique for all offsets or it may vary with each offset. Q compensation methods using an offset-dependent 1-D filter have been proposed, for example, by Xia (2015) and Trantham and He (2017). By using some velocity field, these techniques attempt to predict subsurface travel time $T_s$ only for hyperbolic moveouts in the recorded seismic traces. However, in reality, the recorded seismic traces may contain a plurality of moveout shapes which are not necessarily hyperbolic, as a consequence of the plurality of incidence angles at which seismic waves reach the detectors.

In conventional Q compensation techniques, the velocity field used to approximate subsurface travel time $T_s$ may be estimated from seismic data, prior to the Q compensation task, by manual velocity picking, tomography, or full wavefield inversion. Given the complexity of seismic wave propagation and the lack of information in seismic data, the estimated velocity field typically contains errors which may be very significant in structurally-complex subsurface regions. These errors in the velocity field may affect the calculation of subsurface travel times and in turn lead to phase and amplitude errors in Q compensation. In addition, the second-order normal moveout (NMO) equation, which is most widely used to incorporate velocity information in the creation of the offset-dependent 1-D filters, is known to be accurate only for hyperbolic moveouts in the near-to-mid offset range. Consequently, seismic energy in the form of hyperbolic moveouts recorded at far offsets may be compensated incorrectly.

A third issue with traditional Q compensation techniques is that they equally amplify signal, noise, and spatial aliasing in the recorded seismic traces. This is because a 1-D inverse filter, even in stabilized form, cannot distinguish between signal, noise, and spatial aliasing in the recorded trace through a one-time application. In practice, a maximum gain limit (in decibels) may be used to reduce the amplification of noise and spatial aliasing; however, this same limit may also inhibit the compensation of signal. When the maximum gain limit is set to a high value (for example 40 dBs), the signal may be compensated well but noise and spatial aliasing may be boosted to unacceptable levels. To remedy such boosting, a lower value for the maximum gain limit (for e.g. 20 dBs) may be set, but this approach will not fully compensate the signal and will lead to insufficient resolution enhancement.

To achieve the correct Q-compensated results, it is therefore desirable to apply full directional Q compensation where all incidence angles are corrected. For that, subsurface travel time $T_s$ must be correctly approximated for all moveouts in the recorded seismic traces, not just hyperbolic ones. Additionally, it is desirable to avoid the use of a velocity field since errors in the velocity field may carry over as phase and amplitude errors in the Q compensation. Finally, it is important to avoid amplifying noise and spatial aliasing in the recorded traces and at the same time recover as much signal as possible.

SUMMARY

The present disclosure provides methods for directional Q compensation of seismic data with Q effects related to a subsurface of a survey area. In one embodiment, the method comprises receiving, with a computer, prestack seismic data from the survey area; calculating, with the computer, angle-dependent subsurface travel times associated with the survey area; applying, with the computer, directional Q compensation to the prestack seismic data to obtain Q-compensated data in time-space domain, wherein the directional Q compensation is based on the angle-dependent subsurface travel times; using the Q-compensated data to generate, with the computer, an image of the subsurface; and managing hydrocarbons in the subsurface using the image of the subsurface. Applying directional Q compensation to the prestack seismic data may comprise designing a multi-dimensional filter using the angle-dependent subsurface travel times; and applying the multi-dimensional filter to the prestack seismic data to obtain the Q-compensated data in time-space domain. In other embodiments, applying directional Q compensation to the prestack seismic data may comprise determining an angle-dependent forward E operator and an angle-dependent adjoint E* operator using the angle-dependent subsurface travel times; and applying a sparse inversion algorithm to the prestack seismic data using the angle-dependent forward E operator and the angle-dependent adjoint E* operator to obtain a model of Q-compensated data. The model may be mapped to obtain Q-compensated data in time-space domain.

The present disclosure also provides a method for directional Q compensation of seismic data with Q effects related to a subsurface of a survey area in which applying directional Q compensation to the prestack seismic data comprises determining a preconditioned angle-dependent forward E operator and a preconditioned angle-dependent adjoint E* operator using the angle-dependent subsurface travel times; applying a sparse inversion algorithm to the prestack seismic data using the preconditioned angle-dependent forward E operator and the preconditioned angle-dependent adjoint E* operator to obtain a model of Q-compensated, deghosted data without source effects. In some embodiments, determining a preconditioned angle-dependent forward E operator and a preconditioned angle-dependent adjoint E* operator comprises, respectively, introducing ghost and source effects in a wavelet matrix and a transpose of the wavelet matrix. The model may be mapped to obtain Q-compensated data, deghosted data without source effects in time-space domain. Or the ghost and source effects may be reintroduced in the model before mapping the model to obtain Q-compensated data in time-space domain.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

FIG. 7A is a zoom in of exemplary near offsets of a common-shot gather (input); FIG. 7B illustrates exemplary data obtained with 1-D inverse Q filtering; FIG. 7C illustrates exemplary data obtained by methods described herein; FIG. 7D illustrates the exemplary true answer.

Figure 1:
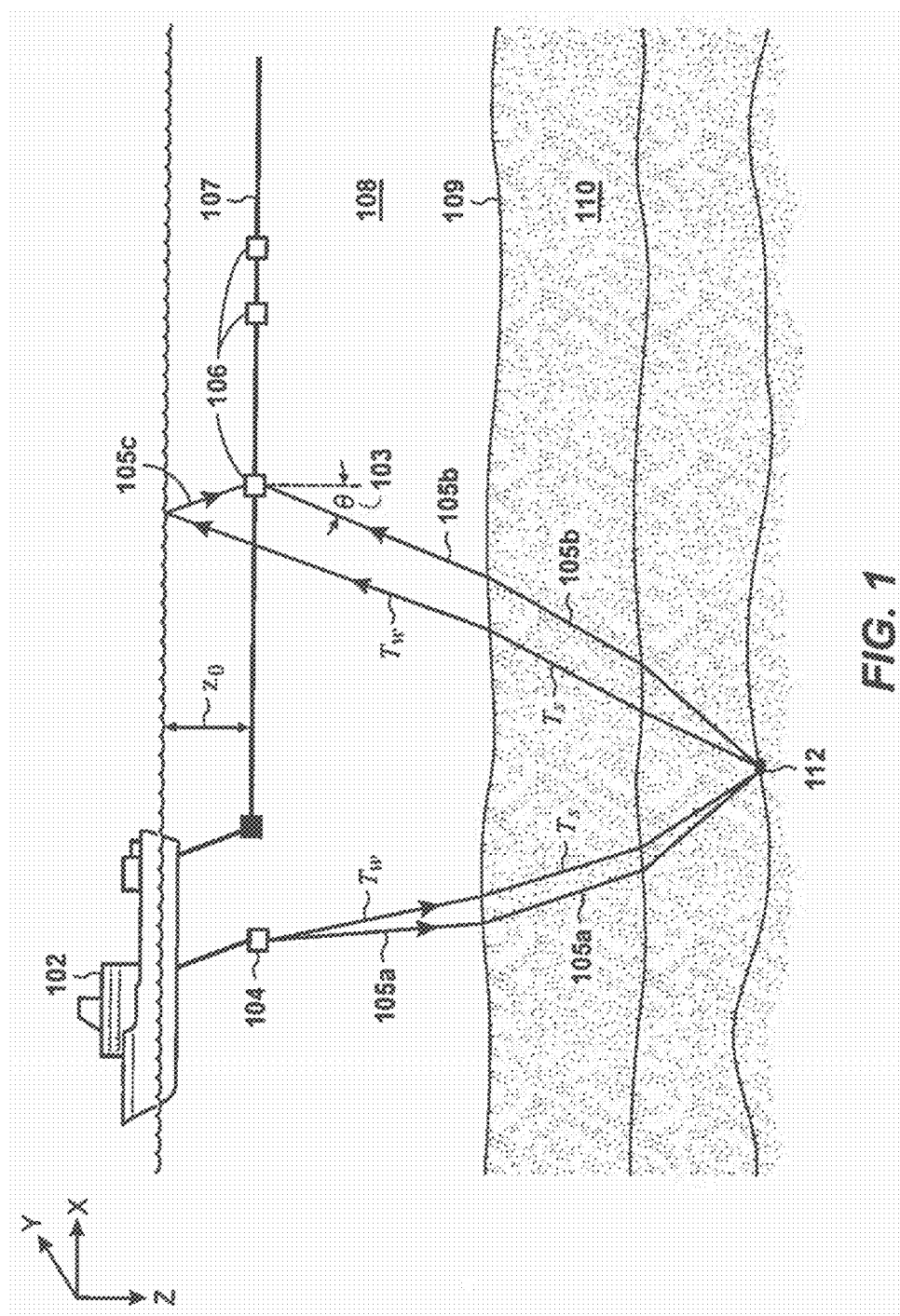
FIG. 1 illustrates a diagram of an exemplary seismic data acquisition system for marine survey applications.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components therein may be shown exaggerated in scale or in schematic form and some details of conventional elements may not be shown in the interest of clarity and conciseness. When describing a figure, the same reference numerals may be referenced in multiple figures for the sake of simplicity.

DETAILED DESCRIPTION

To promote an understanding of the principles of the disclosure, reference will now be made to the features illustrated in the drawings and no limitation of the scope of the disclosure is hereby intended by specific language. Any alterations and further modifications, and any further applications of the principles of the disclosure as described herein are contemplated as would normally occur to one skilled in the art to which the disclosure relates.

Marine Seismic Data Acquisition

With reference to FIG. 1, a diagram of an example of a conventional seismic data acquisition system for marine seismic survey applications is provided. In this example, a vessel 102 tows a plurality of detectors 106 disposed along a cable 107. The vessel 102 may tow a single cable 107 or a plurality of cables at the same time. The detectors 106 may be disposed horizontally at a constant depth $z_0$ relative to the sea surface, they may be slanted at a constant angle with respect to the sea surface, or they may follow a curved profile of any shape. The vessel 102 may tow a seismic source 104 configured to emit an acoustic wave 105a. The acoustic wave 105a may propagate downwards, penetrate the seafloor 109, and experience loss of energy due to absorption during its travel time $T_s$ in the subsurface 110. $T_w$ refers to the time spent by the acoustic wave in the water 108.

The acoustic wave 105a may eventually be reflected by a geologic structure 112 in the subsurface 110 and propagate upwards as acoustic wave 105b until it reaches cable 107. For simplicity, FIG. 1 shows only two ray paths corresponding to acoustic waves 105a and 105b. However, the acoustic wave generated by the source 104 may be a spherical wave, i.e. it may propagate in all angles starting from the source 104 and may reach the cable 107 from all directions. The angle 103 at which an acoustic wave reaches each of the detectors 106 is known as the "incidence angle" θ.

As the reflected acoustic wave 105b travels upwards, it may be recorded by detectors 106 and continue traveling upwards until it reaches the sea surface. Since the interface between water and air acts as a mirror for acoustic waves, a reflected wave 105c may travel back towards detectors 106. The acoustic wave 105c generated from the reflection at the sea surface may be referred to as a detector-side ghost wave if received by a detector, or source-side ghost wave if received by the source 104. The ghost wave 105c may be observed to have opposite polarity as the primary wave 105a if the detector 106 is a hydrophone, and the same polarity if the detector 106 is a geophone. Reflected wave 105c will also exhibit a certain time delay known as the ghost delay.

Directional Q Compensation with Sparsity Constraints

Exemplary embodiments of the technological advancement disclosed herein can be described as addressing the following inverse problem:

$$d=Em \quad (2)$$

where d represents a time-space patch of recorded seismic traces showing Q effects; E is a linear operator that applies Q effects according to Eq. (1) and transforms data from tau-p domain to time-space domain; and m is the desired unknown sparse tau-p model describing seismic data free of Q effects (i.e. the Q-compensated seismic data).

In certain embodiments according to the present disclosure, constructing operator E to apply Q effects according to Eq. (1) may be based on the following general expression for subsurface travel time $T_s$:

$$T_s = T - T_w = T - T_0/\cos(\theta)$$

where T is the total two-way time (also known as recording time), $T_w$ is the time spent by the acoustic wave in the water column, $T_0$ is the zero-offset water-bottom time, and θ is the incidence angle. This derivation assumes a locally-simple earth geology. The subsurface travel time $T_s$ may be approximated as the total two-way time T minus the time spent in the water column $T_w$ with the assumption that water does not attenuate acoustic waves.

Traditional Q compensation techniques, such as those proposed by Xia (2015) and Trantham & He (2017), design an offset-dependent 1-D filter by approximating cos(θ) in Eq. (3) based on the following second-order normal moveout (NMO) equation:

$$\cos(\theta) = \sqrt{1 - \frac{xc}{Tv^2}} \quad (4)$$

where x represents offset, c is the water velocity (assumed known, e.g. 1500 m/s), and v is the RMS velocity at two-way time T. By replacing cos(θ) expressed by Eq. (4) in Eq. (3), the following approximation of subsurface travel time $T_s$ may be obtained:

$$T_s = T - T_w = T - T_0 \Big/ \sqrt{1 - \frac{xc}{Tv^2}} \quad (5)$$

Figure 2:
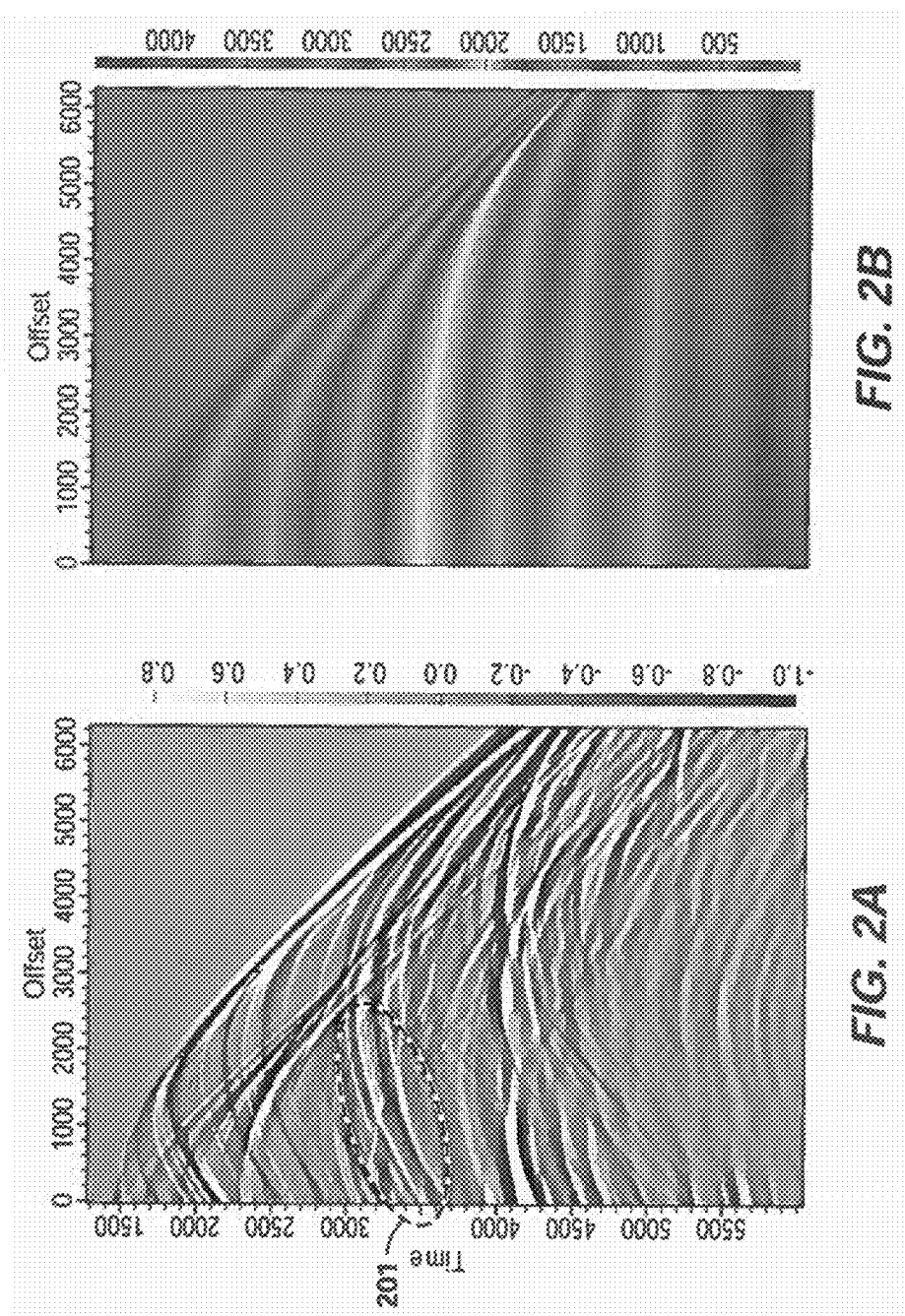
FIG. 2A shows an example record of seismic traces with a variety of moveout shapes.
FIG. 2B shows example subsurface travel times following hyperbolic moveouts.

This expression for subsurface travel time $T_s$ only deals with hyperbolic moveouts in the recorded seismic traces, i.e., for each recording time instant T, cos(θ) is calculated as a constant scalar. In other words, only one incidence angle is assumed to be in the water column at each recording time instant, which may not be realistic given the plurality of incidence angles at which seismic waves reach the detectors at each recording time instant. To illustrate this problem, FIG. 2A provides an example record of seismic traces with a variety of moveout shapes, and FIG. 2B shows example subsurface travel times following hyperbolic moveouts. Using a velocity field, existing 1-D filter techniques attempt to predict subsurface travel time only for hyperbolic moveouts in the recorded seismic traces as shown in FIG. 2B. However in real life, the recorded seismic traces may contain, as shown in FIG. 2A, a plurality of moveout shapes which are not necessarily hyperbolic. For instance, diffracted waves in region 201, which carry valuable seismic information, do not have a hyperbolic moveout. The plurality of moveout shapes in the recorded seismic traces is a consequence of the plurality of incidence angles at which seismic waves reach the detectors.

Additionally, in Eq. (5), the second-order NMO equation, which is most often used, can be inaccurate for hyperbolic moveouts recorded at far offsets. These errors in $\cos(\theta)$ (and thus in $T_s$) are expected to show as phase amplitude errors in the Q compensation of the recorded seismic traces.

According to some aspects of the present disclosure, to address these problems, $\cos(\theta)$ may be expressed directly in tau-p domain as follows:

$$\cos(\theta) = \sqrt{1 - c^2 p_x^2} \quad (6)$$

where $p_x$ is horizontal slowness in the direction along the detectors (known as the inline direction). This expression in tau-p domain assumes that data in the recorded seismic traces has been decomposed into plane waves via the tau-p transform. As is known by those skilled in the art, the terms "plane wave," "angle" and "slowness" may be used interchangeably. It should be understood that reference to the tau-p transform in the present disclosure is not intended to be limiting, and other angle decomposition methods may also be used, such as f-k transform, curvelets, ridgelets, shearlest, etc.

The expression of $\cos(\theta)$ in Eq. (6) thus gives the following angle-dependent expression for subsurface travel time $T_s$:

$$T_s = T - T_w = T - T_0 \sqrt{1 - c^2 p_x^2}. \quad (7)$$

In this expression, the dependence of $T_s$ on slownesses means that, for each recording time instant T, a plurality of incidence angles are assumed to be in the water column, which is more realistic than assuming only one incidence angle. Hence, Eq. (7) provides, in comparison to Eq. (5), a more complete and correct calculation of subsurface travel time $T_s$ where seismic waves are compensated at all incidence angles. Consequently, Eq. (7) provides the correct subsurface travel time $T_s$ for all moveouts in the recorded seismic traces, not just hyperbolic ones.

One important observation about Eq. (7) is that it approximates subsurface travel time $T_s$ with no need for velocity information (which, in contrast, is required by Eq. (5)). By implicitly using tau-p transform and locally decomposing data into plane waves, methods disclosed herein adapt to all moveout shapes in the recorded seismic traces with no need for predicting them by using a second-order NMO equation. This enables such methods to avoid the uncertainties and errors related to the velocity field.

Given this improved computation of angle-dependent subsurface travel time $T_s$, according to one embodiment of the present disclosure, a stabilized multi-dimensional (2-D or 3-D) inverse filter may be designed (in time or frequency domain or both) and applied (e.g., in one iteration) on the recorded seismic traces to achieve directional Q compensation. (In the context of the present disclosure, the terms "directional," "multi-dimensional" and "angle-dependent" may be used interchangeably.) To remove the Q effects expressed in Eq. (1), the stabilized multi-dimensional inverse filter may consist of an exponential frequency boost as a function of subsurface travel time $T_s$ and quality factor Q. Practical consideration may require that the boost be cutoff at some frequency or be limited by a maximum gain limit.

Specifically, a multi-dimensional inverse filter H may be expressed in frequency-slowness (f-$p_x$) domain as follows:

$$H(f, p_x) = e^{+\frac{\pi f T_s}{Q} - \frac{2i f T_s}{Q} \log\left(\frac{f}{f_r}\right)} \quad (8)$$

where $T_s$, as expressed by Eq. (7), has a dependence on two-way time T and horizontal slownesses $p_x$. In practice, to account for the dependence on T, the recorded traces may be separated into overlapping time windows and T may be computed as the center time of the window. This windowed approach simulates the time varying nature of Q compensation. In practice, the exponential amplitude Q correction in Eq. (8) should not be applied "as-is" to high frequencies, otherwise precision errors in the data and high-frequency noise may be boosted to unacceptable levels. Therefore, a cut-off frequency limit (for example 80 Hz) may be introduced and may be defined in terms of a maximum gain limit in decibels (for example 30 dBs). An additional high-cut filter at the cut-off frequency may be implemented to reduce noise. Even though the multidimensional inverse filter in Eq. (8) is expressed in frequency-slowness domain, it should be understood that other formulations are contemplated as may be made by those skilled in the art incorporating the principles described herein.

One advantage of this multi-dimensional Q compensation filter compared to traditional Q compensation techniques based on a 1-D filter is that all incidence angles (i.e. moveouts) in the recorded seismic traces are compensated due to the angle-dependent expression of subsurface travel times in Eq. (7). However, since the multi-dimensional Q compensation filter is based on an inverse filter, this approach may still be unstable with respect to noise and spatial aliasing in the recorded seismic traces. In practice, the maximum gain limit may be adjusted so as to prevent from excessive boosting of noise and spatial aliasing; however, this limit may also inhibit the compensation of signal and lead to insufficient resolution enhancement.

Accordingly, in alternative embodiments according to the present disclosure, directional Q compensation may be applied by using forward and adjoint operators within an optimization problem. Specifically, with the improved slowness-dependent expression of subsurface travel time $T_s$ provided in Eq. (7), the action of forward E operator can be implemented in time-space domain, as conceptually illustrated in FIG. 3. For each data vector 301 at offset $x_j$ in time-space domain, operator E is angle-dependent and sums slowness-indexed vectors over a slowness range of interest, each slowness-indexed vector resulting from the multiplication of the model vector 303 at slowness $p_i$ in tau-p domain with the wavelet matrix 302. The wavelet matrix 302 is used to simulate Q effects for each recording time sample, and may be determined for each offset $x_j$—slowness $p_i$ pair, where j refers to an index over the number of slowness traces in the tau-p model and i refers to an index over the number of recorded traces. Each column of wavelet matrix 302 is a causal wavelet which is the response of a spike to a system described by Eq. (1).

Figure 3:
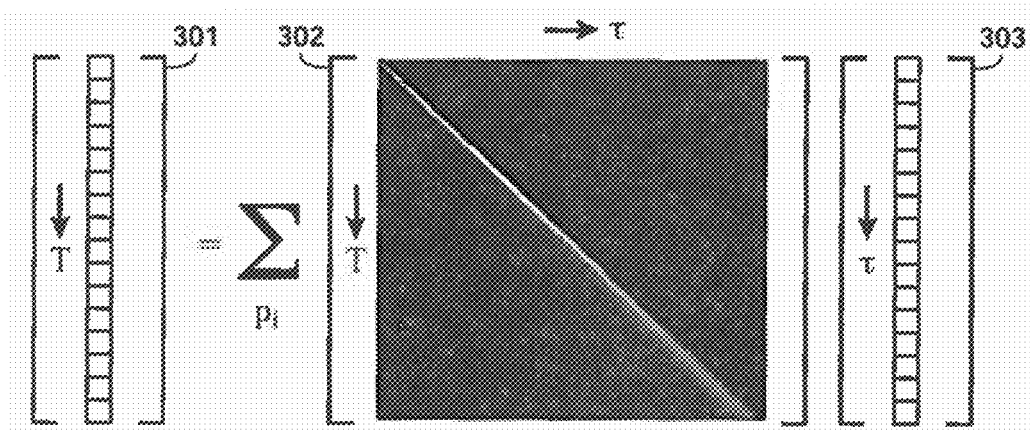
FIG. 3 provides a schematic illustration of the action of forward operator E.
Figure 4:
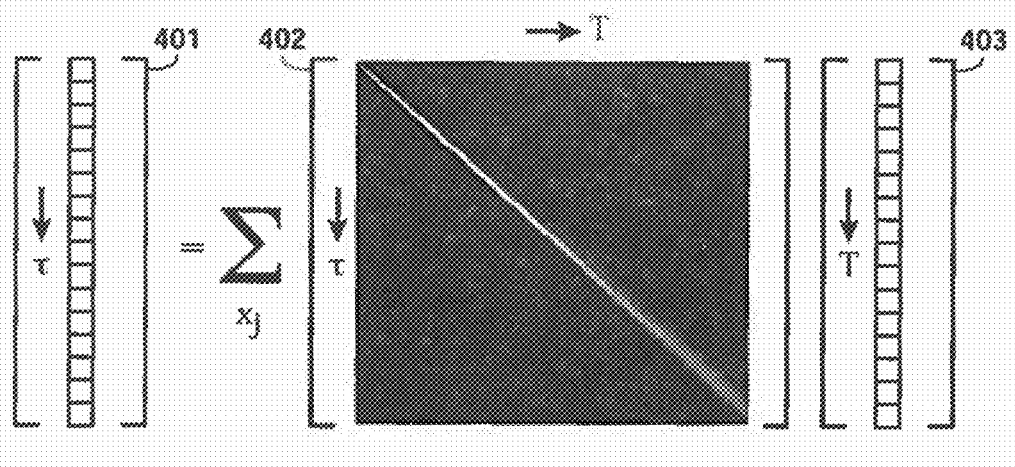
FIG. 4 provides a schematic illustration of the action of adjoint operator E*.

The action of the adjoint operator E* may also be illustrated conceptually in tau-p domain as shown in FIG. 4. For each model vector 401 at slowness $p_i$ in tau-p domain, adjoint operator E* is angle-dependent and sums offset-indexed vectors over an offset range of interest, each offset-indexed vector resulting from the multiplication of data vector 403 at offset $x_i$ in time-space domain with the wavelet matrix 402. Here, the wavelet matrix 402 is the transpose of the wavelet matrix 302 of FIG. 3 used with the forward operator E, and may also be determined for each offset $x_j$—slowness $p_i$ pair. Each column of matrix 402 is an anti-causal wavelet, which is the response of a spike to a system described by the conjugate of Eq. (1).

Yet in other embodiments, the actions of forward operator E and adjoint operator E* may be implemented in the frequency domain via stationary convolutions in Fourier domain. In this case, operator E is used in the inverse problem in the following fashion:

$$d = F^{-1} E F m \qquad (9)$$

where F is the forward Fourier transform operator acting on each trace of the tau-p model m along the time direction, and $F^{-1}$ is the inverse Fourier transform operator acting on each trace of the reconstructed data (EFm) along the time direction. The total two-way time T may be approximated as the center time within overlapping time-space patches of short time duration (e.g., 300 ms).

With these formulations of forward operator E and its adjoint operator E*, according to certain aspects of the present disclosure, a sparse tau-p model describing seismic data free of Q effects may be obtained by minimizing the following objective function:

$$\min_m \|W_d(d - Em)\|_p^p + \lambda \|W_m^{-1} m\|_q^q \qquad (10)$$

where $W_d$ is a diagonal matrix of time-space data weights that may be employed to condition the recorded seismic data, for example against noise or to obtain more uniform amplitudes; $W_m$ is a diagonal matrix of non-zero model weights that may be designed to enhance our preference regarding the model, e.g., smoothness or sparsity; λ is a regularization parameter, and p and q indicate that different norms may be applied on the data misfit and model penalty terms respectively. In the data misfit, the term r=d−Em may be referred to as the data residual. The objective function in Eq. (10) may be solved by a large family of solvers; for example greedy algorithms, iterative shrinkage algorithms, Bregman iterations, proximal point algorithms, expectation maximization algorithms, parallel coordinate descent algorithms, Gauss-Newton algorithms, Marquardt-Levenberg iterations, Ridge Regression, Simplex search, Davidon-Fletcher-Powell algorithms, steepest descent, etc.

For example, in some embodiments, one approach for obtaining a sparse model is to choose an $l_1$ norm for the model penalty term and an $l_2$ norm for the data misfit. This mixed-norm problem may be easily transformed to an $l_2$–$l_2$ problem by setting p=q=2 in Eq. (10) and using model-dependent model weights with diagonal elements defined as:

$$(W_m)_{ii} = \sqrt{|m_i|} \qquad (11)$$

in which index i denotes each element in the model vector.

Furthermore, residual weighting may be used for data weights when the algorithm needs to be robust to data outliers (such as spiky/swell noise) by using residual-dependent data weights with diagonal elements defined as:

$$(W_d)_{ii} = \max(|r_i|^{-0.5}, \epsilon) \qquad (12)$$

in which index i denotes each element in the data residual vector. To avoid division by zero, ϵ may be set as $$\frac{\max(d)}{100},$$

where max(d) denotes the maximum amplitude in the time-space patch of the recorded seismic data. In addition, zero masking may be applied on data weights $W_d$ to exclude data regions that do not need to be fit; for example, the direct arrival or noise preceding the water-bottom reflection, missing traces, or anomalous traces. Furthermore, a controlled t-pow correction may be included in the definition of these data weights to reduce the influence of strong amplitudes on the iterative inversion.

The change of variable $m = W_m u$ transforms the problem in Eq. (10) to standard form (Hansen, 1998):

$$\min_u \|W_d(d - EW_m u)\|_2^2 + \lambda \|u\|_2^2 \qquad (13)$$

where u is the new desired unknown tau-p model. Minimizing this objective function is equivalent to solving the following system of equations:

$$(W_m^T E^* W_d^T W_d E W_m + \lambda I) u = W_m^T E^* W_d^T W_d d. \qquad (14)$$

By writing $E_w = W_d E W_m$, with $E_w$ being the weighted, sparse version of operator E, the following concise system of equations may thus be solved:

$$(E_w^* E_w + \lambda I) u = E_w^* W_d d. \qquad (15)$$

The system of Eq. (15) is not linear since $E_w$ depends on $W_m$ and $W_d$, which in turn depend on the unknown models m and u. To deal with this nonlinearity, according to some aspects of the present disclosure, iteratively reweighted least squares (IRLS) with conjugate gradient least squares (CGLS) may be used (Trad et. al., 2003). In this embodiment, external iterations may be used to update model weights $W_m$ and data weights $W_d$; and for each external iteration, internal CGLS iterations may be used with fixed model and data weights to improve data fitting. After a certain number of external and internal iterations, a solution $u_s$ describing seismic data free of Q effects may be obtained. The Q-compensated seismic data may then be obtained by computing $RW_m u_s$.

Solving the system of equations expressed by Eq. (15) may require a new iteration process for each new λ. In addition, regularization may hinge on absolute amplitudes when λ is set in terms of the maximum amplitude in the data. Since the problem is posed in standard form, λ may be set to zero and the iteration number may play the role of the regularization parameter (so called "iterative regularization"). This regularization strategy only depends on relative amplitudes acted upon by model and data weighting operators and benefits from the intrinsic regularizing effect of CG (Hansen, 1998); as a consequence, iterations can be stopped long before convergence to monitor adequacy of the solution. Increasing the number of external iterations may result in sparser tau-p weights and a solution more resistant to data outliers. While monitoring that sparsity does not get overly promoted, more internal iterations may be used to get reasonably small residuals. Too many internal iterations may, however, result in fitting noise—a process known as "semi-convergence".

One advantage of the foregoing methodology is that sparsity weights that may be encoded in $W_m$ reduce the energy related to incoherent noise and spatial aliasing in tau-p domain. This allows Q compensation of high-frequency signals while penalizing incoherent noise, and also offers protection against spatial aliasing that may exist in the recorded seismic traces. This resistance to spatial aliasing eliminates the need to perform prior interpolation/extrapolation of the input recorded seismic traces or the need to regrid them and place them on a regular grid before applying methods according to the present disclosure.

Figure 5:
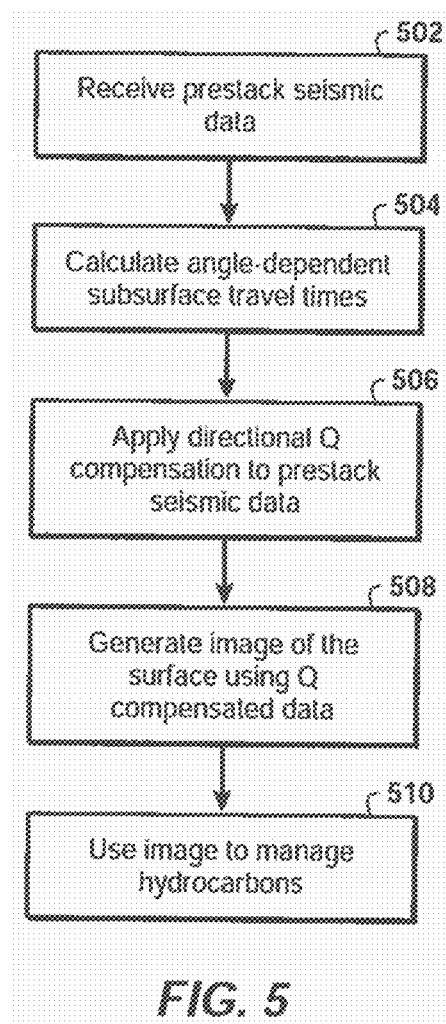
FIG. 5 is a flowchart of a method according to certain embodiments of the present disclosure.

Accordingly, FIG. 5 is a flow chart illustrating a method according to some embodiments described above. At step 502, recorded seismic traces (i.e. prestack seismic data for a survey area) may be received. The data may be obtained by seismic survey techniques known in the art and exemplarily illustrated in FIG. 1, or by operations of a computer to select, access, download, or receive electronically the data. The prestack seismic data may include pressure, pressure gradient, velocity, acceleration, and other particle motion data. The prestack seismic data may be decomposed into overlapping time-space patches.

Next, at step 504, angle-dependent subsurface travel times $T_s$ for the survey area may be calculated as expressed in Eq. (7) for a range of slowness values. For example, if the prestack seismic data is decomposed into overlapping time-space patches, the subsurface travel times $T_s$ may be calculated for each time-space patch.

At step 506, directional Q compensation may be applied to the prestack seismic data. For example, a stabilized multi-dimensional inverse filter may be designed based on the angle-dependent subsurface travel times $T_s$ and applied to the prestack seismic data to achieve Q compensation. In some embodiments, the multi-dimensional inverse filter may be expressed as in Eq. (8). Alternatively, directional Q compensation may be applied by determining an angle-dependent forward operator E and its adjoint operator E*, based on the angle-dependent subsurface travel times $T_s$, as illustrated in FIG. 3 and FIG. 4. These operators may then be used to solve an inverse problem similar to Eq. (2) to obtain a model of Q-compensated data, for example, by solving the system of equations expressed in Eq. (15). The model of Q-compensated data may in turn be mapped to time-space domain to obtain the Q-compensated data seismic traces.

At step 508, the Q-compensated data may then be used to generate an image of the subsurface as is well known to those skilled in the art. The image of the subsurface may then be used to manage hydrocarbons at step 510. As used herein, hydrocarbon management using models and/or images of the subsurface generated according to the present disclosure includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 6A:
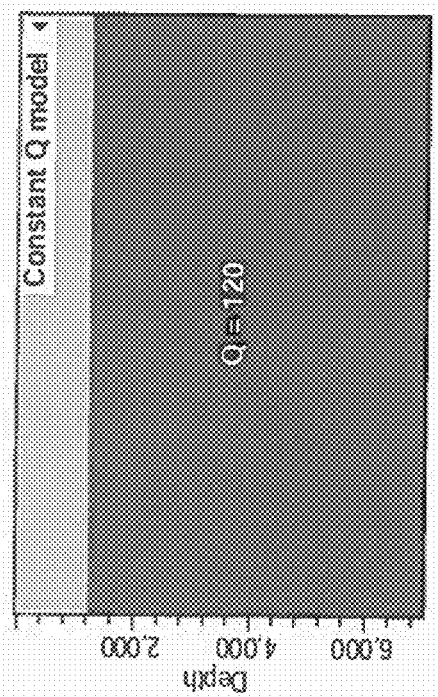
FIG. 6A illustrates an exemplary $V_p$ model.
Figure 6B:
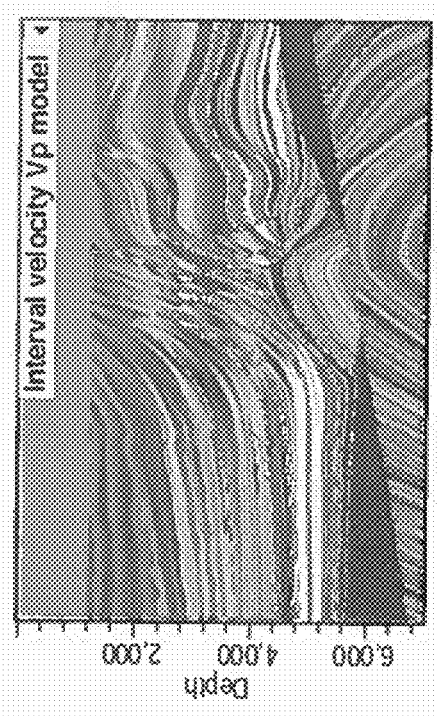
FIG. 6B illustrates an exemplary Q model.
Figure 6C:
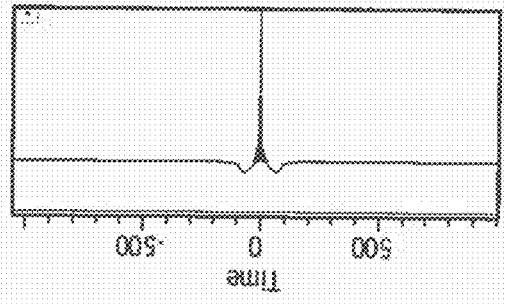
FIG. 6C illustrates an exemplary zero-phase source signature.
Figure 6D:
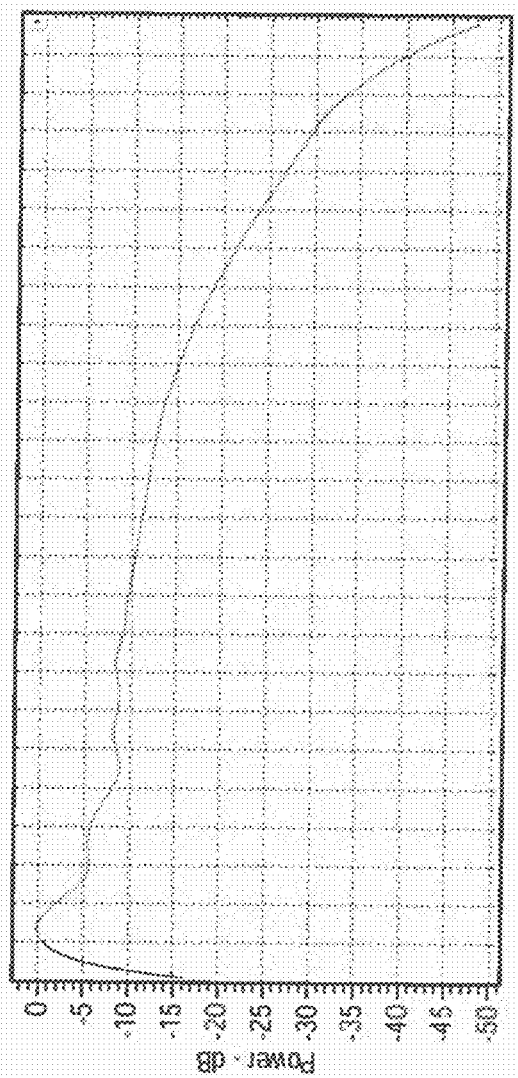
FIG. 6D illustrates an exemplary amplitude spectrum of the source signature.

To illustrate some benefits of the present disclosure, FIG. 6A provides an exemplary velocity model from the Marmousi earth model, and FIG. 6B shows a corresponding constant Q model. The Q model of FIG. 6B assumes constant earth Q=120 and non-absorptive (Q=9999) water column. Based on these two models, synthetic common-shot gathers were generated using finite difference and the following parameters:

Absorbing boundary at the sea-surface, i.e. no source-side or detector-side ghosts;
Zero-phase broadband source signature (FIG. 6C);
Frequencies up to 90 Hz (FIG. 6D);
Cable with 0-6 km offset and 12.5 m receiver spacing.

The finite difference used in the forward simulation models Q effects in the time domain using a set of stress-strain relations (Moczo & Kristek, 2005). This forward simulation of Q effects is different from Q effects implemented through operator E, with the goal of avoiding the so-called "inverse crime" in the validation of the results of applying the methodology of the present disclosure.

Methods for directional Q compensation were applied to the synthetic common-shot gathers generated as described above. Specifically, angle-dependent forward operator E and its adjoint operator E* were determined based on the angle-dependent subsurface travel times $T_s$, and applied within a sparse inversion scheme on 20-traces-wide, 300-ms-long overlapping time-space patches on the synthetic seismic traces. The sparse inversion was based on 6 external iterations and 300 internal iterations. As a benchmark, 1-D offset-dependent inverse filters using the true velocity information (FIG. 6A) were designed and applied to the simulated synthetic traces, and a maximum gain limit of 30 dBs was set to obtain maximum resolution at the reservoir level in the Marmousi model. Both methods used a reference frequency equal to 200 Hz. To test the validity of the results, a "true answer" dataset was generated using finite difference assuming a non-absorptive earth, i.e. no Q model was used in the forward simulation.

To illustrate the results, FIG. 7A shows a zoom in on near-offset traces of the synthetic common-shot gather before Q compensation. FIG. 7B and FIG. 7C show a zoom in of the same data after applying Q compensation using offset-dependent 1-D inverse filters and the sparse inversion method for directional Q compensation described above, respectively. FIG. 7D shows the true answer. An excellent match in phase and amplitude can be observed between the results of the directional Q compensation approach based on sparse inversion (FIG. 7C) and the true answer (FIG. 7D), much better than that obtained using 1-D inverse filters (FIG. 7B). It can also be appreciated in FIG. 7B that diffracted energy 701 is over-compensated by the Q compensation based on the offset-dependent 1-D inverse filters, whereas the directional Q compensation method according to the present disclosure yield amplitudes which are very comparable to the true answer. Beneficially, such directional Q compensation can achieve such very close match to the true answer with no need for velocity information. It should be understood that these benefits are equally applicable to the multi-dimensional inverse filter approach for directional Q compensation according to alternative embodiments of the present disclosure, since it is based on angle-dependent subsurface travel times $T_s$ as well.

Figure 8A:
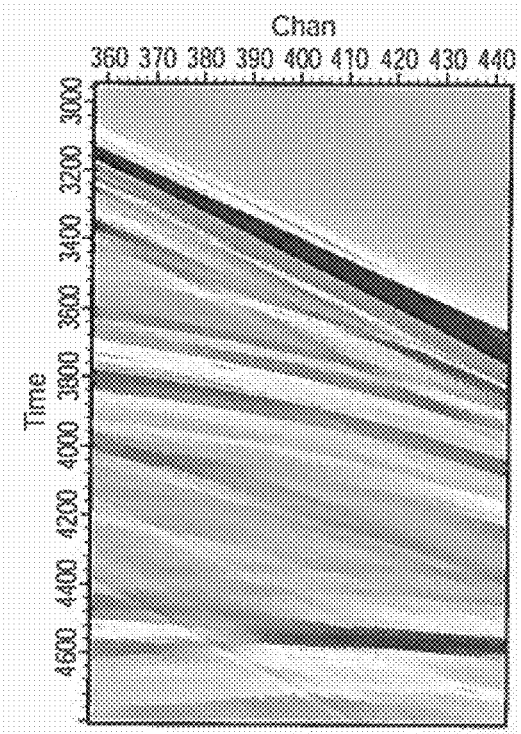
FIG. 8A is a zoom in of exemplary far offsets of a common-shot gather (input)
Figure 8B:
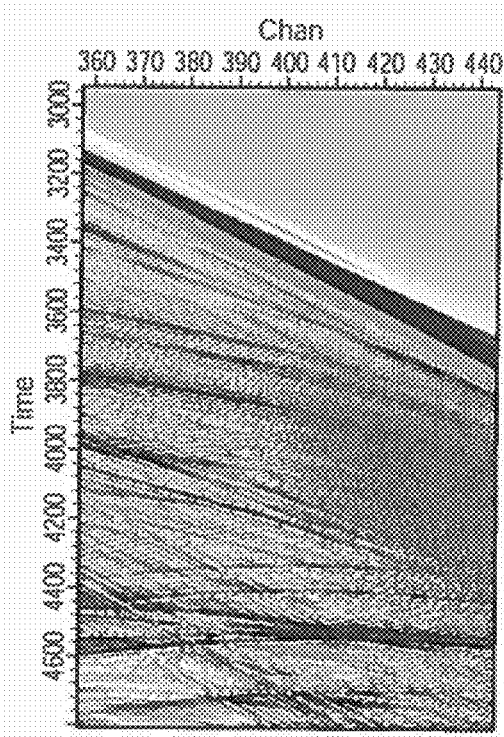
FIG. 8B illustrates exemplary data obtained with 1-D inverse Q filtering.
Figure 8C:
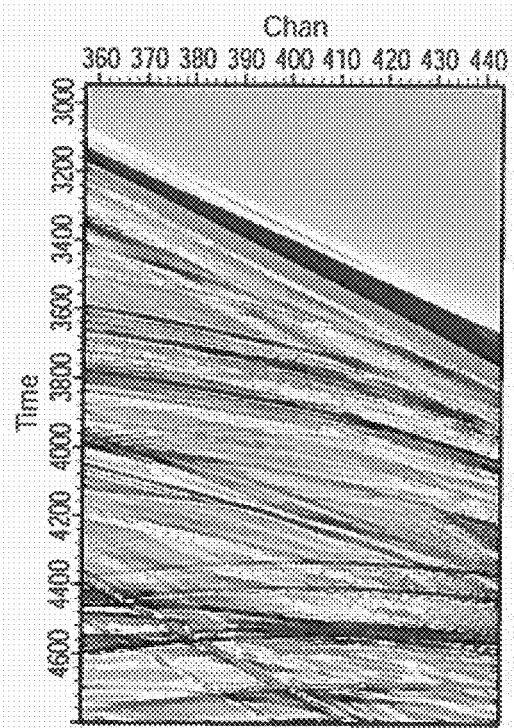
FIG. 8C illustrates exemplary data obtained by methods described herein.
Figure 8D:
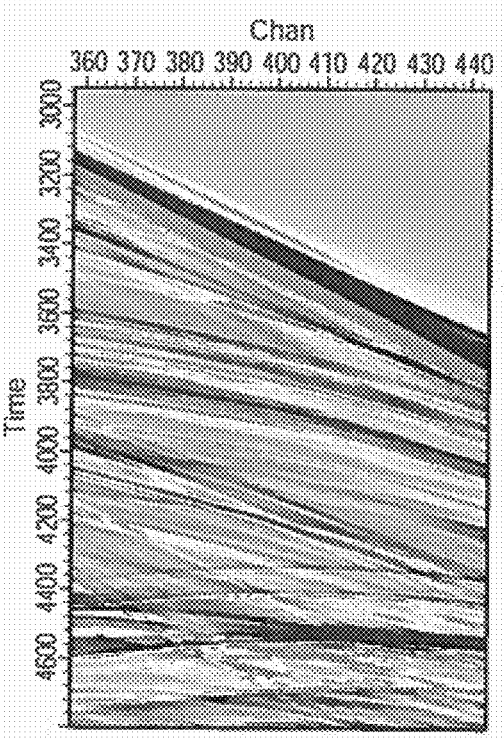
FIG. 8D illustrates the exemplary true answer.

To further illustrate advantages of the technological advancement of the present disclosure over existing computer-related technology in geophysical data processing, FIG. 8A shows a zoom in on far-offset traces of the same synthetic common-shot gather before Q compensation. FIG. 8B and FIG. 8C show a zoom in of the same data after applying Q compensation using offset-dependent 1-D inverse filters and directional Q compensation based on sparse inversion as described above, respectively. FIG. 8D is the true answer. As can be appreciated in FIG. 8B, at far offsets, Q compensation based on the offset-dependent 1-D inverse filters boosts spatial aliasing and over-compensates amplitudes. In contrast, as shown in FIG. 8C, directional Q compensation deals well with spatial aliasing and results in amplitudes which are closer to the true answer FIG. 8D. Here, the match with the true answer of FIG. 8D is not as good as for the near offsets, given the difficulty in approximating subsurface travel time which is explained by the structural complexity of the Marmousi velocity model. However, the benefits over conventional 1-D filtering techniques are easily appreciated. As with the near-offset example, it should be understood that the benefit of not over-compensating the far-offset seismic energy is equally applicable to directional Q compensation using a multi-dimensional inverse filter according to alternative embodiments of the present disclosure. However, the multi-dimensional inverse filter, since it does not use sparsity constraints, may boost spatial aliasing.

Benefits of using the adjoint operator E* instead of an inverse filter include improved stability in the Q compensation. Unlike the inverse filter, which "flips" the sign of both the real and imaginary parts inside the exponential in Eq. (1), the adjoint operator E* only flips the sign of the imaginary part. This makes the adjoint-based directional Q compensation stable by definition.

Figure 9:
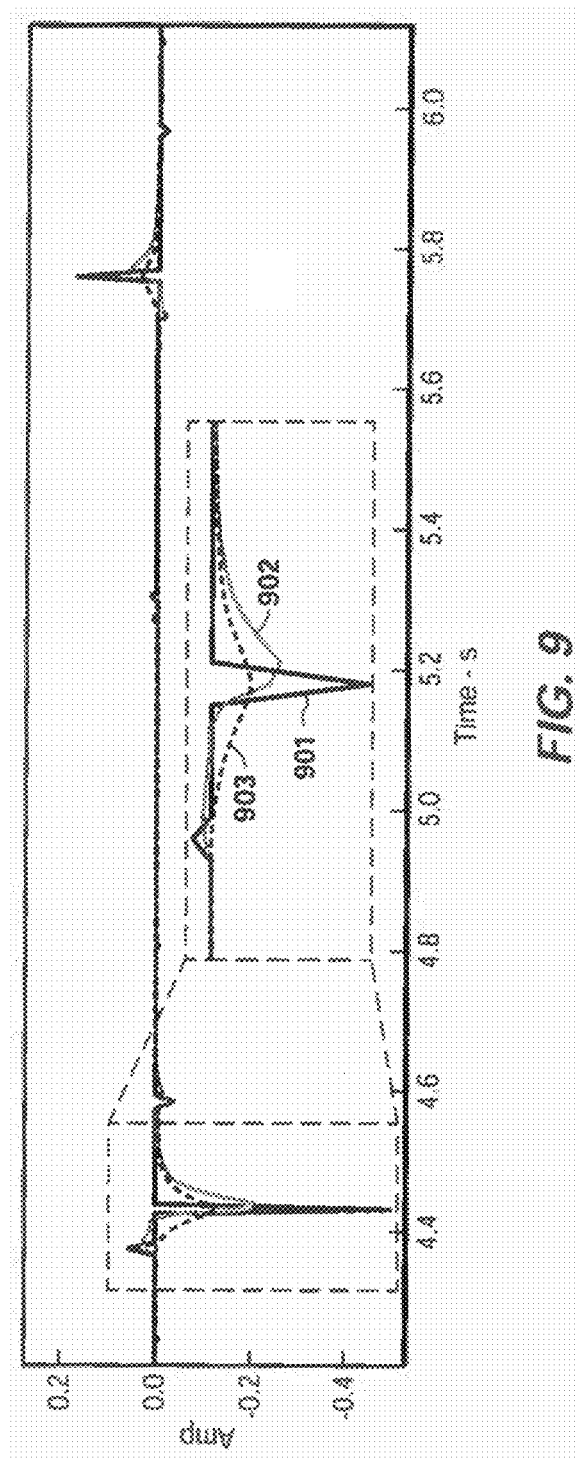
FIG. 9 shows an exemplary original trace, the trace with Q effects, and the trace after applying an adjoint Q operator.

To further illustrate the effect of the adjoint operator E*, FIG. 9 provides an exemplary original trace 901 without Q effects. The 1-D trace exhibiting Q effects is labeled 902. The output trace 903 after applying the adjoint operator E* results in the correct time alignment, similar to the original trace 901 without Q effects. However, amplitudes in the original trace 901 have been attenuated twice, once by the forward Q effect and once by the adjoint. This is the reason why iterative recovery of high frequencies with adjoint-based Q compensation may be so slow and expensive in recovering high frequency signals.

Preconditioned Directional Q Compensation with Sparsity Constraints

Figure 10:
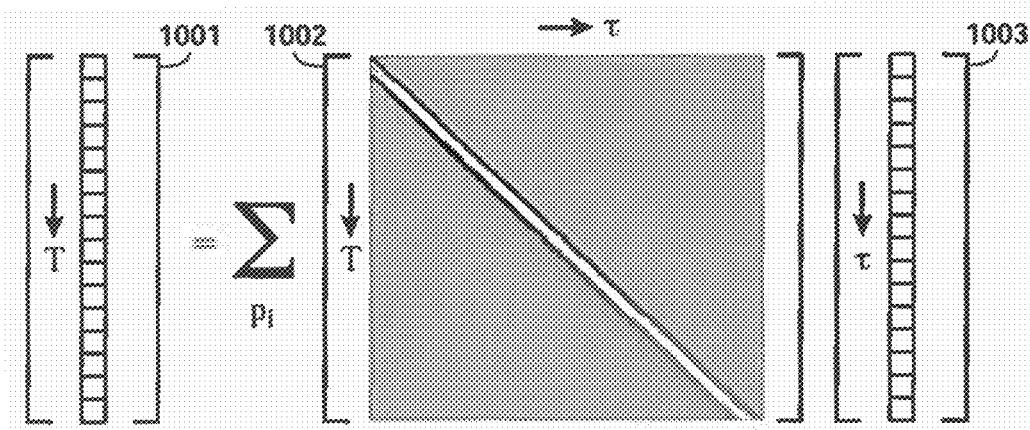
FIG. 10 provides a schematic illustration of the action of preconditioned forward operator E.
Figure 11:
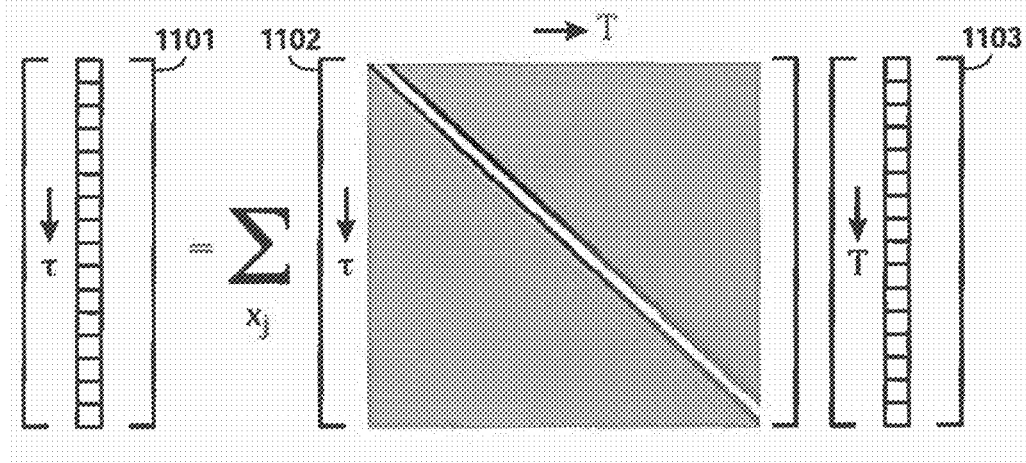
FIG. 11 provides a schematic illustration of the action of preconditioned adjoint operator E*.

To address the slow convergence issue described above, additional embodiments according to the present disclosure may accelerate convergence of directional Q compensation by preconditioned angle-dependent operators E and E*, as conceptually illustrated in FIG. 10 and FIG. 11, respectively. Preconditioning may be used to improve the condition number of an inverse problem and reach the solution faster.

In FIG. 10, similar to FIG. 3, for each data vector 1001 at offset $x_j$ in time-space domain, preconditioned operator E is angle-dependent and sums slowness-indexed vectors over a slowness range of interest, each slowness-indexed vector resulting from the multiplication of the model vector 1003 at slowness $p_i$ in tau-p domain with the wavelet matrix 1002. The wavelet matrix 1002 may be determined for each offset $x_j$—slowness $p_i$ pair. Unlike the wavelet matrix 302, the wavelet matrix 1002 includes, at each column, the source signature with source and reflector ghosts, and with Q effects. In the preconditioned definition of forward operator E, as shown in FIG. 10, each column of the wavelet matrix 1002 may be represented by a ghosted source signature with Q effects. In other words, to determine the preconditioned forward operator E, ghosting may be introduced in the source and detector sides for each offset $x_j$—slowness $p_i$ pair. For each offset 1001, the detector depth is assumed to be known. The source depth may also be assumed to be known for each common-shot gather. The source signature may be a 1-D wavelet which is unique for all slowness traces or it may be available for each slowness. Q effects are introduced on the ghosted source signature according to Eq. (1) with angle-dependent subsurface travel times $T_s$.

Likewise, similar to FIG. 4, the action of the preconditioned adjoint operator E* is illustrated in FIG. 11. For each model vector 1101 at slowness $p_i$ in tau-p domain, preconditioned adjoint operator E* is angle-dependent and sums offset-indexed vectors over an offset range of interest, each offset-indexed vector resulting from the multiplication of the data vector 1103 at offset $x_i$ in time-space domain with the wavelet matrix 1102. Here, the wavelet matrix 1102 is the transpose of the wavelet matrix 1002 of FIG. 10 used with the preconditioned operator E, and may be determined for each offset $x_j$—slowness $p_i$ pair. Unlike the wavelet matrix 402, the wavelet matrix 1102 includes, at each column, the source signature with source and reflector ghosts, in addition to Q effects introduced by using angle-dependent subsurface travel times $T_s$. In other words, to determine the preconditioned adjoint operator E*, ghosting may be introduced in the source and detector sides for each offset $x_j$—slowness $p_i$ pair, as with the preconditioned forward operator E. The source signature may be a 1-D wavelet estimated from the recorded seismic traces (e.g. the water bottom reflection) or modeled using software (e.g. Nucleus). The source signature may be assumed to be known, for example, a minimum-phase (causal) wavelet with bubble oscillations related to the source. When near-field hydrophone measurements are available, directional source signatures may be modeled in the far-field and be available as a volume of tau-p wavelets which are typically minimum-phase (causal) and may contain bubble oscillations.

As discussed above, ghosting in the source and detector sides may be applied on the source signature for each offset-slowness pair. The detector depth for each offset trace and the slowness value determine the detector ghost delay (e.g., in ms), which in turn controls the detector-side ghosting. In the same way, the source depth for each common-shot gather and the slowness value determine the source ghost delay (e.g., in ms), which in turn controls the source-side ghosting. Detector and source depths are usually recorded during the seismic survey and are assumed to be known. In the definition of the ghosting operator, the sea surface reflection coefficient may be assumed equal to −1.0 (exact reflection) or may be dependent on the angle of incidence and the frequency of the seismic wave.

The preconditioned angle-dependent operators E and E* may be used according to one embodiment of the present disclosure to minimize the objective function in Eq. (10) for a time-space patch of recorded seismic traces showing Q effects, source- and detector-side ghost effects, and source directivity effects. Since the source signature and ghost waves are part of operators E (forward modeling) and E* (adjoint modeling), the iterative application of these operators to solve the optimization problem in Eq. (10) leads to a high-resolution spike-sparse tau-p model describing seismic data free of Q effects, source-side and detector-side ghosts, and source directivity effects. Because of this important improvement in sparsity, the convergence towards the solution is faster relative to using the non-preconditioned versions of operators E and E*. Consequentially, this approach may lead to faster recovery of high frequencies for directional Q compensation and addresses the issue of slow convergence related to adjoint-based iterative Q compensation.

Once a high-resolution spike-sparse tau-p solution is found, each trace of this solution may be convolved with a target wavelet, e.g. a zero-phase bubble-free broadband wavelet and be mapped to time-space domain via a reverse tau-p transform to achieve Q compensation, source designature, and source-side and detector-side deghosting. The target wavelet may be adapted to different purposes; for example, it may be shaped to a reflectivity well log spectrum to obtain a measure of reflectivity from the recorded seismic traces, or it may be shaped to an impedance well log spectrum to obtain a measure of pseudo-impedance from the recorded seismic traces. The estimated high-resolution spike-sparse tau-p solution may optionally be re-ghosted in the source and detector sides and convolved with the source signature when deghosting and source designature are not desired in the final Q-compensated result.

Figure 12:
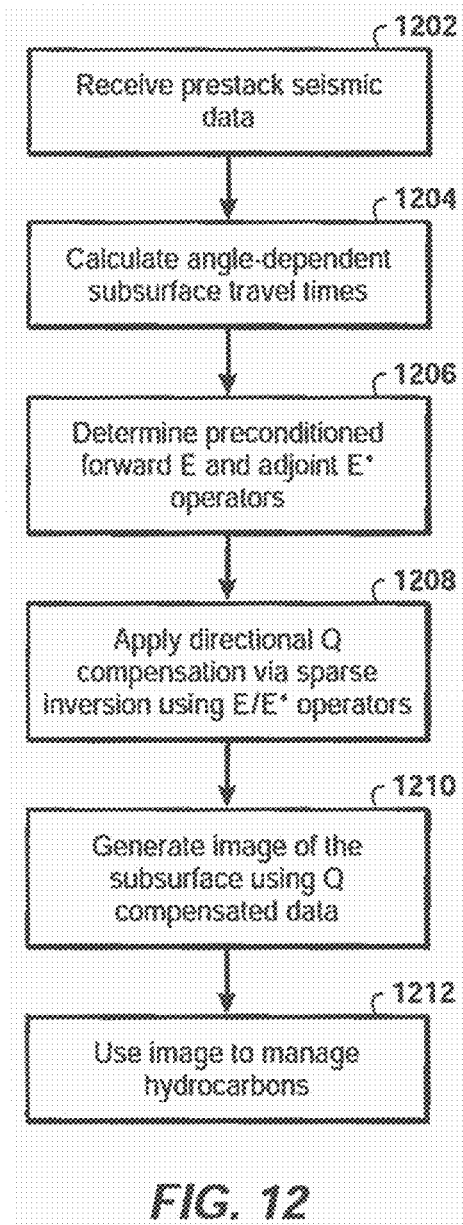
FIG. 12 is a flowchart of a method according to certain other embodiments of the present disclosure.

Accordingly, FIG. 12 shows a flowchart of a directional Q compensation method employing preconditioned forward and adjoint operators E and E*. Recorded seismic traces (i.e., prestack seismic data) may be received at step 1202 in similar manner as in step 502 described with reference to FIG. 5. The prestack seismic data may be decomposed into overlapping time-space patches. Then, at step 1204, angle-dependent subsurface travel times $T_s$ may be computed as expressed in Eq. (7) for a range of slowness values. For example, if the prestack seismic data is decomposed into overlapping time-space patches, the subsurface travel times $T_s$ may be calculated for each time-space patch.

Next, at step 1206, preconditioned forward operator E and its adjoint E* may be determined as shown in FIG. 10 and FIG. 11 based on the angle-dependent subsurface travel times T. As part of this process, the wavelet matrix may be modified to include the source signature, source- and detector-side ghosts, in addition to Q effects. At step 1208, directional Q compensation may be applied to the prestack seismic data using the preconditioned forward operator E and its adjoint E* operator in an inverse problem similar to Eq. (2) to obtain a model of Q-compensated data, for example, by solving the system of equations expressed in Eq. (15). The model of Q-compensated data may in turn be mapped to time-space domain to obtain the Q-compensated data seismic traces, with source-side and detector-side deghosting and with source designature. Optionally, ghost and source effects may be reintroduced in the model prior to mapping to time-space domain. At step 1210, the Q-compensated data in time-space domain may then be used to generate an image of the subsurface, which may be used to manage hydrocarbons at step 1212.

To illustrate advantages of methods described herein using preconditioned angle-dependent operators E and E*, synthetic common-shot gathers were generated using finite difference and the Marmousi model presented in FIG. 6A. The following parameters were used in the forward simulation:
  Constant earth Q=120 model with non-absorptive (Q=9999) water column, as shown in FIG. 6B;
  Reflective boundary at the sea-surface which generates source-side or detector-side ghosts;
  Minimum-phase broadband source with bubble oscillations;
  Source towed at 8 m and cable towed at 20 m with 0-6 km offsets and 12.5 m receiver spacing.

Directional Q compensation with preconditioned E and E* operators was applied on 20-traces-wide, 500-ms-long overlapping time-space patches on the synthetic seismic traces. Here, the desired solution was obtained via the sparse inversion with only 3 external iterations and 25 internal iterations, unlike for the non-preconditioned method which necessitated 6 external iterations and 300 internal iterations to generate the results in FIG. 7C and FIG. 8C. This observation confirms that the preconditioning does indeed improve convergence. To further illustrate the benefits of the results, a "true answer" dataset was generated using finite difference assuming:
  Non-absorptive earth, i.e. no Q model was used in the forward simulation;
  Absorptive boundary at the sea surface, i.e. no source or detector ghost;
  Zero-phase broadband source signature with no bubble oscillations.
In other words, the true-answer data is free of Q effects, free of source-side and detector-side ghosts, and is perfectly zero-phase with no bubble oscillations.

Figures 13A, 13B, 13C:
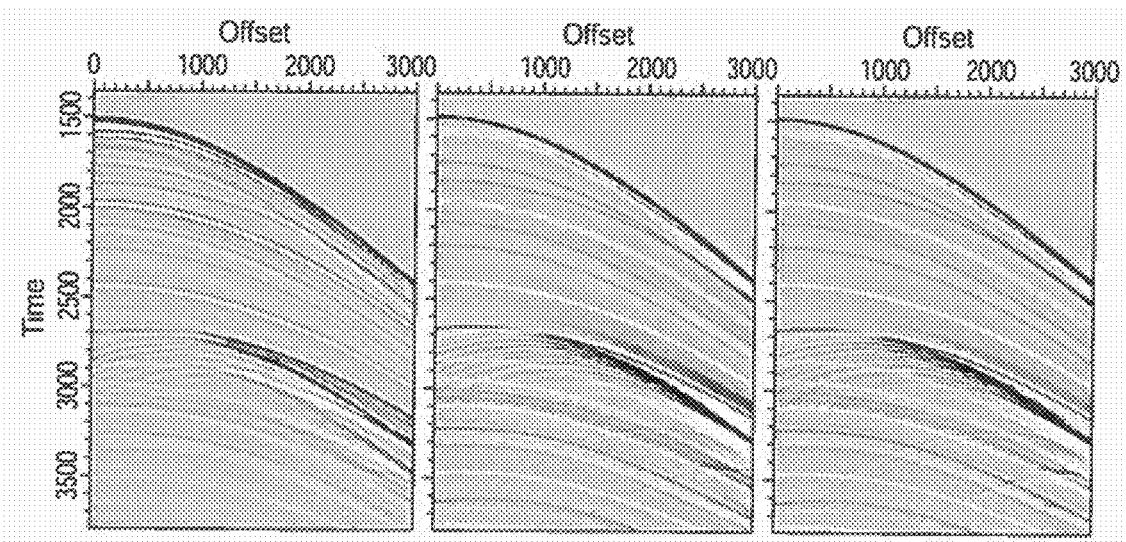
FIG. 13A is a zoom in of exemplary shallow seismic events in a common-shot gather.
FIG. 13B illustrates exemplary data obtained by applying preconditioned operators according to some aspects of the present disclosure.
FIG. 13C illustrates the exemplary true answer for the shallow events.
Figures 13D, 13E, 13F:
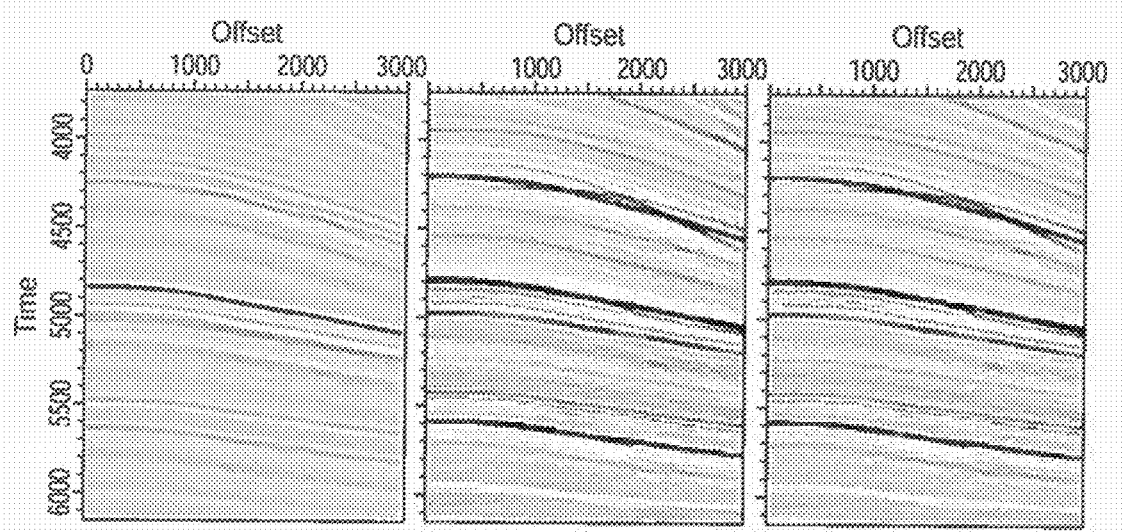
FIG. 13D is a zoom in of exemplary deep events in a common-shot gather.
FIG. 13E illustrates exemplary data obtained by applying preconditioned operators according to some aspects of the present disclosure.
FIG. 13F illustrates the exemplary true answer for the deep events.

FIG. 13A shows a zoom in on shallow events of near-offset traces of the synthetic common-shot gather before Q compensation. FIG. 13B shows the data after applying directional Q compensation based on the preconditioned approach described herein. An excellent match is observed when compared to the true answer in FIG. 13C for such shallow events. Similarly, FIG. 13D shows a zoom in on deep events of near-offset traces of the synthetic common-shot gather before Q compensation. FIG. 13E shows the data after applying directional Q compensation based on the preconditioned approach described herein. An excellent match is observed when compared to the true answer in FIG. 13F for such deep events. Beneficially, the preconditioned approach according to aspects of the present disclosure achieved such very close match with the true answer with no need for velocity information.

Figure 14:
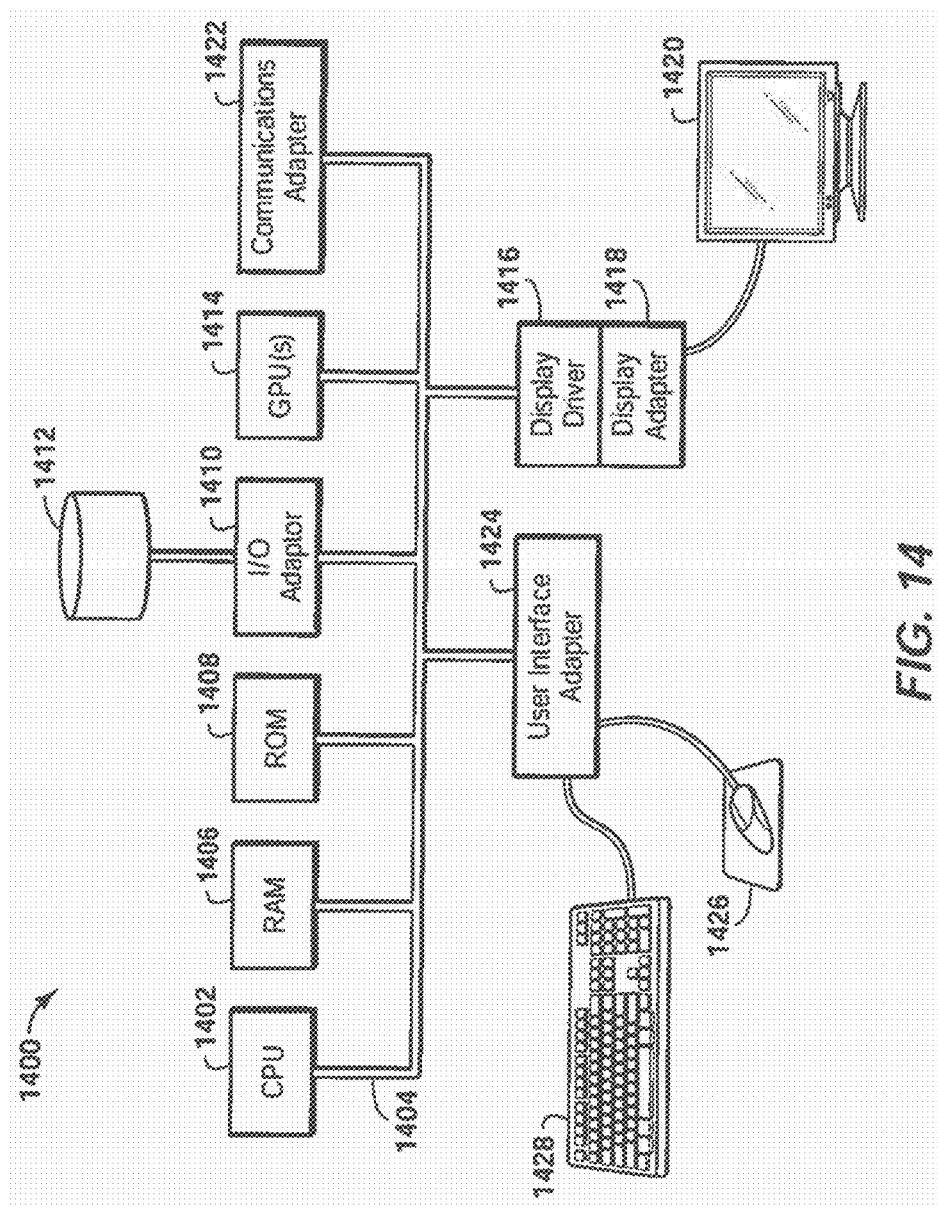
FIG. 14 is a diagram of an exemplary computer system that may be utilized to implement methods described herein.

Aspects of the present disclosure may be implemented using computer systems known in the art, such as systems commonly used in geophysical prospecting and data processing. For example, FIG. 14 is a diagram of an exemplary computer system 1400 that may be utilized to implement methods described herein. A central processing unit (CPU) 1402 is coupled to system bus 1404. The CPU 1402 may be any general-purpose CPU, although other types of architectures of CPU 1402 (or other components of exemplary system 1400) may be used as long as CPU 1402 (and other components of system 1400) supports the operations as described herein. Those of ordinary skill in the art will appreciate that, while only a single CPU 1402 is shown in FIG. 14, additional CPUs may be present. Moreover, the computer system 1400 may comprise a networked, multi-processor computer system that may include a hybrid parallel CPU/GPU system. The CPU 1402 may execute the various logical instructions according to various teachings disclosed herein. For example, the CPU 1402 may execute machine-level instructions for performing processing according to the operational flow described.

The computer system 1400 may also include computer components such as non-transitory, computer-readable media. Examples of computer-readable media include a random access memory (RAM) 1406, which may be SRAM, DRAM, SDRAM, or the like. The computer system 1400 may also include additional non-transitory, computer-readable media such as a read-only memory (ROM) 1408, which may be PROM, EPROM, EEPROM, or the like. RAM 1406 and ROM 1408 hold user and system data and programs, as is known in the art. The computer system 1400 may also include an input/output (I/O) adapter 1410, a graphics processing unit (GPU) 1414, a communications adapter 1422, a user interface adapter 1424, a display driver 1416, and a display adapter 1418.

The I/O adapter 1410 may connect additional non-transitory, computer-readable media such as a storage device(s) 1412, including, for example, a hard drive, a compact disc (CD) drive, a floppy disk drive, a tape drive, and the like to computer system 1400. The storage device(s) may be used when RAM 1406 is insufficient for the memory requirements associated with storing data for operations of the present techniques. The data storage of the computer system 1400 may be used for storing information and/or other data used or generated as disclosed herein. For example, storage device(s) 1412 may be used to store configuration information or additional plug-ins in accordance with the present techniques. Further, user interface adapter 1424 couples user input devices, such as a keyboard 1428, a pointing device 1426 and/or output devices to the computer system 1400. The display adapter 1418 is driven by the CPU 1402 to control the display on a display device 1420 to, for example, present information to the user regarding available plug-ins.

The architecture of system 1400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1400 may include various plug-ins and library files. Input data may additionally include configuration information, Disclosed aspects may include any combinations of the methods and systems shown in the following numbered paragraphs. This is not to be considered a complete listing of all possible aspects, as any number of variations can be envisioned from the description above.

Embodiment 1

A method for directional Q compensation of seismic data with Q effects related to a subsurface of a survey area, the method comprising receiving, with a computer, prestack seismic data from the survey area; calculating, with the computer, angle-dependent subsurface travel times associated with the survey area; applying, with the computer, directional Q compensation to the prestack seismic data to obtain Q-compensated data in time-space domain, wherein the directional Q compensation is based on the angle-dependent subsurface travel times; using the Q-compensated data to generate, with the computer, an image of the subsurface; and managing hydrocarbons in the subsurface using the image of the subsurface.

Embodiment 2

The method of embodiment 1, wherein applying directional Q compensation to the prestack seismic data comprises designing a multi-dimensional filter using the angle-dependent subsurface travel times; and applying the multi-dimensional filter to the prestack seismic data to obtain the Q-compensated data in time-space domain.

Embodiment 3

The method of embodiment 1, wherein applying directional Q compensation to the prestack seismic data comprises determining an angle-dependent forward E operator and an angle-dependent adjoint E* operator using the angle-dependent subsurface travel times; and applying a sparse inversion algorithm to the prestack seismic data using the angle-dependent forward E operator and the angle-dependent adjoint E* operator to obtain a model of Q-compensated data.

Embodiment 4

The method of embodiment 3, further comprising mapping the model to obtain Q-compensated data in time-space domain.

Embodiment 5

The method of embodiment 1, wherein applying directional Q compensation to the prestack seismic data comprises determining a preconditioned angle-dependent forward E operator and a preconditioned angle-dependent adjoint E* operator using the angle-dependent subsurface travel times; and applying a sparse inversion algorithm to the prestack seismic data using the preconditioned angle-dependent forward E operator and the preconditioned angle-dependent adjoint E* operator to obtain a model of Q-compensated, deghosted data without source effects.

Embodiment 6

The method of embodiment 5, further comprising mapping the model to obtain Q-compensated data, deghosted data without source effects in time-space domain.

Embodiment 7

The method of embodiment 5, wherein determining a preconditioned angle-dependent forward E operator and a preconditioned angle-dependent adjoint E* operator comprises, respectively, introducing ghost and source effects in a wavelet matrix and a transpose of the wavelet matrix.

Embodiment 8

The method of embodiment 7, further comprising reintroducing ghost and source effects in the model.

Embodiment 9

The method of embodiment 8, further comprising mapping the model to obtain Q-compensated data in time-space domain.

Embodiment 10

The method of embodiment 1, wherein the prestack seismic data includes at least one of pressure, pressure gradient, velocity, acceleration, and other particle motion data.

Embodiment 11

The method of embodiment 1, wherein directional Q compensation is applied to the prestack seismic data on time-space patches of the prestack seismic data.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

REFERENCES

The following references are incorporated herein by reference in their entirety in jurisdictions where it is permitted:

Futterman, W. I., "Dispersive body waves," J. Geophysics Res., 67, 5729-5291 (1962).

Moczo, P. and J. Kristek, "On the rheological models used for time domain method of seismic wave propagation," Geophys. Res. Lett., 32, L01306 (2005).

Trad, D., Ulrych, T., and Sacchi, M., "Latest views of the sparse Radon transform," Geophysics, v. 68(1), pp. 386-399 (2003).

Trantham, E. C., and He, K., "AVA Friendly Q Amplitude Compensation," SEG International Exposition and 87$^{th}$ Annual Meeting, pp. 643-645 (2017).

Xia, G., "Proper time-referencing for prestack Q estimation and compensation", 67$^{th}$ EAGE Conference & Exhibition (2005).

Hansen, P., "Rank-deficient and discrete ill-posed problems: numerical aspects of linear inversion", SIAM Monographs on Mathematical Modeling and Computation (2005), pp. 145-149 (chapter 6).

What is claimed is:

1. A method for directional Q compensation of seismic data with Q effects related to a subsurface of a survey area, the method comprising:
   receiving, with a computer, prestack seismic data from the survey area;
   calculating, with the computer, angle-dependent subsurface travel times associated with the survey area;
   applying, with the computer, directional Q compensation to the prestack seismic data to obtain Q-compensated data in time-space domain, wherein the directional Q compensation is based on the angle-dependent subsurface travel times;
   using the Q-compensated data to generate, with the computer, an image of the subsurface; and
   managing hydrocarbons in the subsurface using the image of the sub surface;
   wherein applying directional Q compensation to the prestack seismic data comprises:
   determining an angle-dependent forward E operator and an angle-dependent adjoint E* operator using the angle-dependent subsurface travel times; and
   applying a sparse inversion algorithm to the prestack seismic data using the angle-dependent forward E operator and the angle-dependent adjoint E* operator to obtain a model of Q-compensated data.

2. The method of claim 1, wherein applying directional Q compensation to the prestack seismic data comprises:
   designing a multi-dimensional filter using the angle-dependent subsurface travel times; and
   applying the multi-dimensional filter to the prestack seismic data to obtain the Q-compensated data in time-space domain.

3. The method of claim 1, further comprising mapping the model to obtain Q-compensated data in time-space domain.

4. The method of claim 1, wherein the prestack seismic data includes at least one of pressure, pressure gradient, velocity, acceleration, and other particle motion data.

5. The method of claim 1, wherein directional Q compensation is applied to the prestack seismic data on time-space patches of the prestack seismic data.

6. A method for directional Q compensation of seismic data with Q effects related to a subsurface of a survey area, the method comprising:
   receiving, with a computer, prestack seismic data from the survey area;
   calculating, with the computer, angle-dependent subsurface travel times associated with the survey area;
   applying, with the computer, directional Q compensation to the prestack seismic data to obtain Q-compensated data in time-space domain, wherein the directional Q compensation is based on the angle-dependent subsurface travel times;
   using the Q-compensated data to generate, with the computer, an image of the subsurface; and
   managing hydrocarbons in the subsurface using the image of the subsurface;
   wherein applying directional Q compensation to the prestack seismic data comprises:
   determining a preconditioned angle-dependent forward E operator and a preconditioned angle-dependent adjoint E* operator using the angle-dependent subsurface travel times; and
   applying a sparse inversion algorithm to the prestack seismic data using the preconditioned angle-dependent forward E operator and the preconditioned angle-dependent adjoint E* operator to obtain a model of Q-compensated, deghosted data without source effects.

7. The method of claim 6, further comprising mapping the model to obtain Q-compensated data, deghosted data without source effects in time-space domain.

8. The method of claim 6, wherein determining a preconditioned angle-dependent forward E operator and a preconditioned angle-dependent adjoint E* operator comprises, respectively, introducing ghost and source effects in a wavelet matrix and a transpose of the wavelet matrix.

9. The method of claim 8, further comprising reintroducing ghost and source effects in the model.

10. The method of claim 9, further comprising mapping the model to obtain Q-compensated data in time-space domain.

11. The method of claim 6, wherein applying directional Q compensation to the prestack seismic data comprises:
    designing a multi-dimensional filter using the angle-dependent subsurface travel times; and
    applying the multi-dimensional filter to the prestack seismic data to obtain the Q-compensated data in time-space domain.

12. The method of claim 6, wherein the prestack seismic data includes at least one of pressure, pressure gradient, velocity, acceleration, and other particle motion data.

13. The method of claim 6, wherein directional Q compensation is applied to the prestack seismic data on time-space patches of the prestack seismic data.

* * * * *